United States Patent
Cretors (10) Patent No.: US 8,201,492 B2
(45) Date of Patent: Jun. 19, 2012

(54) POPCORN POPPING MACHINES AND ASSOCIATED METHODS OF MANUFACTURE AND USE

(75) Inventor: Charles D. Cretors, Lake Forest, IL (US)

(73) Assignee: C. Cretors & Company, Chicago, IL (US)

( * ) Notice: Subject to any disclaimer, the term of this patent is extended or adjusted under 35 U.S.C. 154(b) by 585 days.

(21) Appl. No.: 12/399,747

(22) Filed: Mar. 6, 2009

(65) Prior Publication Data
US 2009/0223378 A1 Sep. 10, 2009

Related U.S. Application Data

(60) Provisional application No. 61/068,635, filed on Mar. 7, 2008.

(51) Int. Cl.
*A23L 1/18* (2006.01)
(52) U.S. Cl. ..................................... 99/323.9
(58) Field of Classification Search .................. 99/323.9
See application file for complete search history.

(56) References Cited

U.S. PATENT DOCUMENTS

| | | |
|---|---|---|
| 1,251,291 A | 12/1917 | Scheeffer |
| 1,436,400 A | 11/1922 | Mabey |
| 1,477,704 A | 12/1923 | Holcomb et al. |
| 1,501,114 A | 7/1924 | Howe |
| 1,961,812 A | 6/1934 | Burch |
| 1,987,388 A | 1/1935 | Cretors |
| 2,123,663 A | 7/1938 | Roach |
| 2,232,954 A | 2/1941 | Manley |
| 2,248,812 A | 7/1941 | Cretors |
| 2,477,416 A | 7/1949 | Page |
| 2,549,449 A | 4/1951 | Gibson |
| 2,570,126 A | 10/1951 | Hobbs |
| 2,586,347 A | 2/1952 | Kloster |
| 2,654,823 A | 10/1953 | Altemiller |
| 2,812,704 A | 11/1957 | Hawks |
| 2,856,841 A | 10/1958 | Cretors et al. |
| 2,858,761 A | 11/1958 | Denniss |
| 2,907,264 A | 10/1959 | Bushway |
| 2,939,379 A | 6/1960 | Schmitt |
| 2,984,169 A | 5/1961 | Bushway |

(Continued)

FOREIGN PATENT DOCUMENTS

DE 8624682 12/1986

(Continued)

OTHER PUBLICATIONS

Non-Final Office Action; U.S. Appl. No. 11/942,648; Mailing Date: May 27, 2011, 8 pages.

(Continued)

*Primary Examiner* — Alvin Hunter
(74) *Attorney, Agent, or Firm* — Perkins Coie LLP (57) ABSTRACT

Popcorn popping machines and associated methods of manufacture and use are disclosed herein. A popcorn popping machine configured in accordance with one embodiment of the disclosure includes a housing having an interior portion and a first side portion opposite a second side portion. The popcorn popping machine also includes a corn mover, a heat source, and an air mover positioned in the interior portion. The air mover is positioned on a support shaft extending from the first side portion to the second side portion of the housing. In operation, the air mover is configured to direct heated air from the heat source to corn kernels moved through the interior portion by the corn mover.

16 Claims, 7 Drawing Sheets

U.S. PATENT DOCUMENTS

| | | | | |
|---|---|---|---|---|
| 3,095,326 | A | 6/1963 | Green et al. | |
| 3,120,168 | A | 2/1964 | Lippert | |
| 3,140,952 | A | 7/1964 | Cretors | |
| 3,156,451 | A | 11/1964 | Waas | |
| 3,450,068 | A | 6/1969 | Temple | |
| 3,512,989 | A | 5/1970 | Smith | |
| 3,554,115 | A | 1/1971 | Manley et al. | |
| 3,568,782 | A * | 3/1971 | Cox | 175/72 |
| 3,650,199 | A * | 3/1972 | Sachnik | 99/518 |
| 3,697,289 | A | 10/1972 | Day et al. | |
| 3,739,953 | A | 6/1973 | Cretors | |
| 3,751,267 | A * | 8/1973 | Sachnik | 426/520 |
| 3,783,854 | A | 1/1974 | Hurko et al. | |
| 3,930,996 | A | 1/1976 | Day et al. | |
| 4,120,236 | A * | 10/1978 | Blomberg | 99/323.9 |
| 4,152,974 | A * | 5/1979 | Tienor | 99/323.8 |
| 4,165,620 | A | 8/1979 | Gehauf nee Kiesel et al. | |
| 4,173,925 | A | 11/1979 | Leon | |
| 4,178,843 | A | 12/1979 | Crabtree et al. | |
| 4,182,229 | A | 1/1980 | VandeWalker | |
| 4,206,695 | A | 6/1980 | Cretors | |
| 4,288,686 | A | 9/1981 | Cretors | |
| 4,331,124 | A | 5/1982 | Seidel et al. | |
| 4,438,682 | A | 3/1984 | King et al. | |
| 4,512,247 | A | 4/1985 | Friedman | |
| 4,648,719 | A | 3/1987 | Roben et al. | |
| 4,649,263 | A | 3/1987 | Goodlaxson | |
| 4,763,568 | A | 8/1988 | Kiczek | |
| 4,914,834 | A * | 4/1990 | Sime | 34/169 |
| 5,033,363 | A | 7/1991 | King et al. | |
| 5,035,173 | A | 7/1991 | Stein et al. | |
| 5,046,481 | A | 9/1991 | Warwick | |
| 5,069,923 | A * | 12/1991 | Hubbard et al. | 426/445 |
| 5,083,505 | A | 1/1992 | Kohlstrung et al. | |
| 5,154,161 | A | 10/1992 | Rogers et al. | |
| 5,203,256 | A | 4/1993 | Mueller | |
| 5,301,601 | A | 4/1994 | Cretors | |
| 5,311,930 | A | 5/1994 | Bruenn | |
| 5,315,919 | A | 5/1994 | Hoeberigs | |
| 5,339,726 | A | 8/1994 | Poulson | |
| 5,397,219 | A | 3/1995 | Cretors | |
| 5,417,148 | A | 5/1995 | Cavallo | |
| 5,419,239 | A | 5/1995 | Covington et al. | |
| 5,445,073 | A | 8/1995 | Gilwood | |
| 5,501,139 | A | 3/1996 | Lee et al. | |
| 5,555,792 | A * | 9/1996 | Stein et al. | 99/323.9 |
| 5,579,681 | A | 12/1996 | Ubert et al. | |
| 5,590,582 | A | 1/1997 | Weiss | |
| 5,605,091 | A | 2/1997 | Garber | |
| 5,662,024 | A | 9/1997 | Cretors et al. | |
| 5,690,018 | A | 11/1997 | Hansen | |
| 5,694,830 | A | 12/1997 | Hodgson et al. | |
| 5,743,172 | A | 4/1998 | Weiss et al. | |
| 5,771,779 | A | 6/1998 | Stein et al. | |
| 5,787,798 | A | 8/1998 | Stein et al. | |
| 5,871,792 | A | 2/1999 | Weiss et al. | |
| 5,979,301 | A | 11/1999 | Perttola | |
| 6,000,318 | A | 12/1999 | Weiss et al. | |
| 6,123,011 | A | 9/2000 | Cretors | |
| 6,164,192 | A | 12/2000 | Stein et al. | |
| 6,164,193 | A | 12/2000 | Perttola | |
| 6,234,063 | B1 | 5/2001 | Evers et al. | |
| 6,374,727 | B1 * | 4/2002 | Cretors | 99/323.9 |
| 6,382,087 | B1 | 5/2002 | Iiyama | |
| 6,412,395 | B1 | 7/2002 | Weiss et al. | |
| 6,412,396 | B1 * | 7/2002 | Wright | 99/323.9 |
| 6,534,103 | B2 | 3/2003 | Weiss | |
| 6,578,468 | B1 | 6/2003 | Horn | |
| 6,672,201 | B2 | 1/2004 | Evans, Sr. et al. | |
| 6,872,923 | B2 | 3/2005 | Cretors et al. | |
| 6,914,226 | B2 | 7/2005 | Ottaway | |
| 7,024,986 | B2 | 4/2006 | Kurosawa | |
| 7,846,493 | B1 * | 12/2010 | Cox | 427/200 |
| 2003/0159591 | A1 | 8/2003 | Evans et al. | |
| 2004/0265993 | A1 | 12/2004 | Darling et al. | |
| 2009/0041915 | A1 | 2/2009 | Biechteler | |
| 2009/0126579 | A1 | 5/2009 | Cretors et al. | |
| 2011/0027434 | A1 | 2/2011 | Cretors | |
| 2011/0076372 | A1 | 3/2011 | Cretors | |
| 2011/0076373 | A1 | 3/2011 | Cretors et al. | |

FOREIGN PATENT DOCUMENTS

| | | | |
|---|---|---|---|
| DE | 20120429 U1 | | 7/2002 |
| FR | 2401387 | | 3/1979 |
| JP | 2006081587 A | * | 3/2006 |
| WO | WO-9310698 | | 6/1993 |
| WO | WO-2004/054384 | | 7/2004 |

OTHER PUBLICATIONS

Final Office Action; U.S. Appl. No. 11/661,050; Mailing Date: Nov. 26, 2010, 15 pages.

International Search Report and Written Opinion; PCT/US10/50442, Mailed on Nov. 23, 2010, Applicant: C. Cretors & Company, 10 pages.

International Search Report for PCT/EP2005/009010; reported Dec. 16, 2005; Applicant: Pfister and Pfister, 6 pages.

International Search Report and Written Opinion for PCT/US2008/075083; reported Nov. 12, 2008; Applicant: C. Cretors and Company, 8 pages.

Non-Final Office Action; U.S. Appl. No. 11/661,050; Mailing Date: May 26, 2010, 19 pages.

Non-Final Office Action; U.S. Appl. No. 10/453,428; Mailing Date: Jul. 27, 2004, 6 pages.

LOEB Equipment 20 Gallon Groen Model DNTA20 Twin Scrape Agitated Jacketed Kettle; www.loebequipment.com, Oct. 31, 2011, 1 page.

* cited by examiner

POPCORN POPPING MACHINES AND ASSOCIATED METHODS OF MANUFACTURE AND USE

CROSS-REFERENCE TO RELATED APPLICATIONS

The present application claims priority to and incorporates by reference in its entirety U.S. Provisional Patent Application No. 61/068,635 entitled "POPCORN POPPING MACHINES AND ASSOCIATED METHODS OF MANUFACTURE AND USE" filed Mar. 7, 2008.

TECHNICAL FIELD

The present disclosure relates generally to popcorn popping machines.

BACKGROUND

Popcorn popping machines are known in the art. One type of conventional popcorn popping machine makes popcorn by heating corn kernels in oil. Another type of popcorn popping machine, known as a "dry" popping machine, makes popcorn by heating corn kernels in hot air. In a "dry" popping machine, the corn kernels are subjected to a current of hot air to heat the kernels to the popping temperature. After popping the popcorn in the hot air, flavoring (e.g., butter, caramel, oil, etc.) can be added to the popcorn if desired. Popping machines using hot air to pop large quantities of popcorn are typically used for commercial purposes.

BRIEF DESCRIPTION OF THE DRAWINGS

FIG. 2A is an isometric view, FIG. 2B is a front side view, FIG. 2C is a right side view, FIG. 2D is a left side view.

DETAILED DESCRIPTION

The following disclosure describes various types of popcorn popping machines and methods of making and using such popping machines. Certain details are set forth in the following description and in FIGS. 1A-2E to provide a thorough understanding of various embodiments of the invention. Other details describing well-known structures and systems often associated with popping machines, however, are not set forth below to avoid unnecessarily obscuring the description of the various embodiments of the invention.

Many of the details and features shown in the Figures are merely illustrative of particular embodiments of the invention. Accordingly, other embodiments can have other details and features without departing from the spirit and scope of the present disclosure. In addition, those of ordinary skill in the art will understand that further embodiments can be practiced without several of the details described below. Various embodiments of the invention can include structures other than those illustrated in the Figures and are expressly not limited to the structures shown in the Figures.

In the Figures, identical reference numbers identify identical or at least generally similar elements. To facilitate the discussion of any particular element, the most significant digit or digits of any reference number refer to the Figure in which that element is first introduced. For example, element 110 is first introduced and discussed with reference to FIG. 1. Moreover, the various elements and features illustrated in the Figures may not be drawn to scale.

Figure 1A:
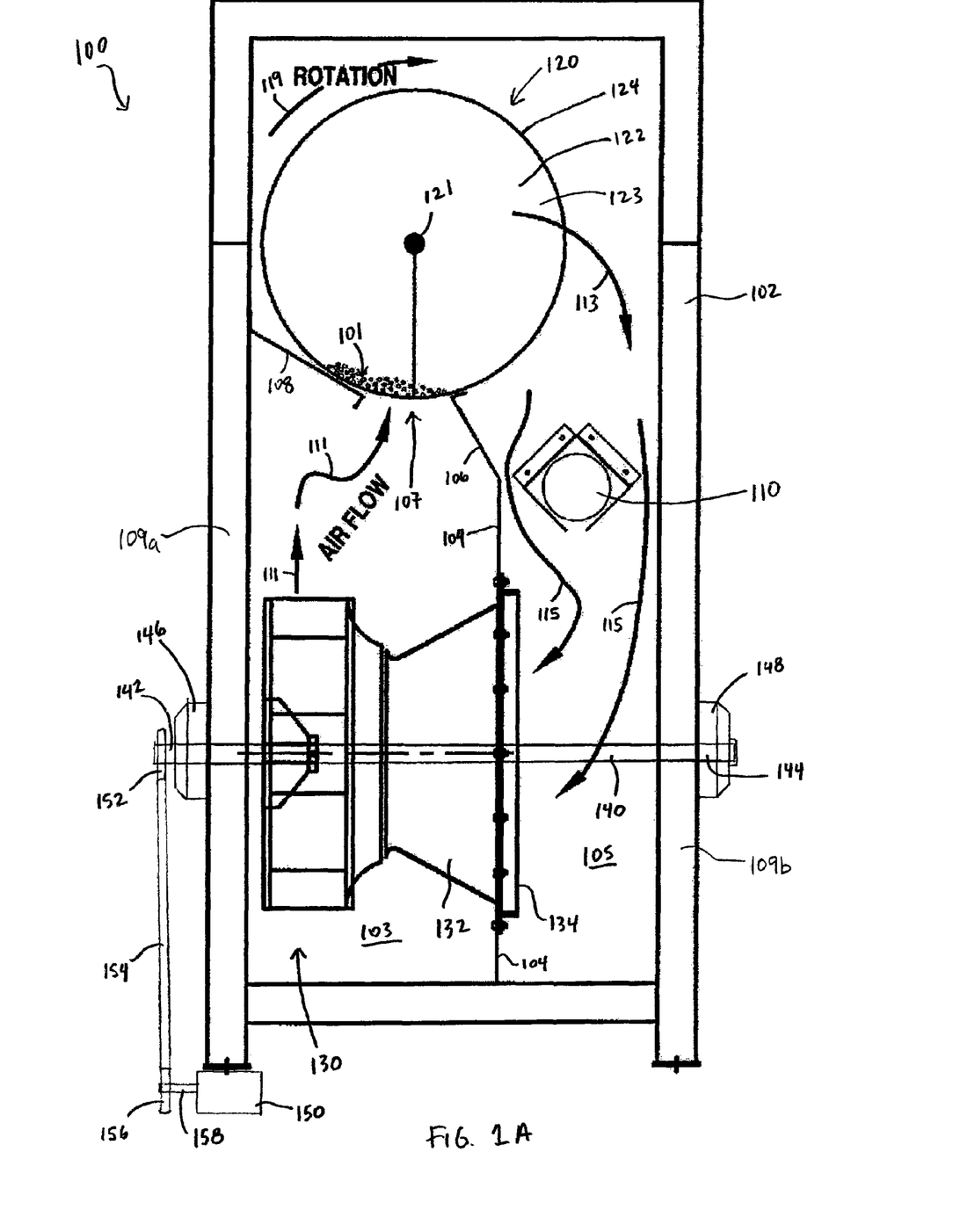
FIG. 1A is a schematic side view of a popcorn popping machine configured in accordance with an embodiment of the disclosure.
Figure 1B:
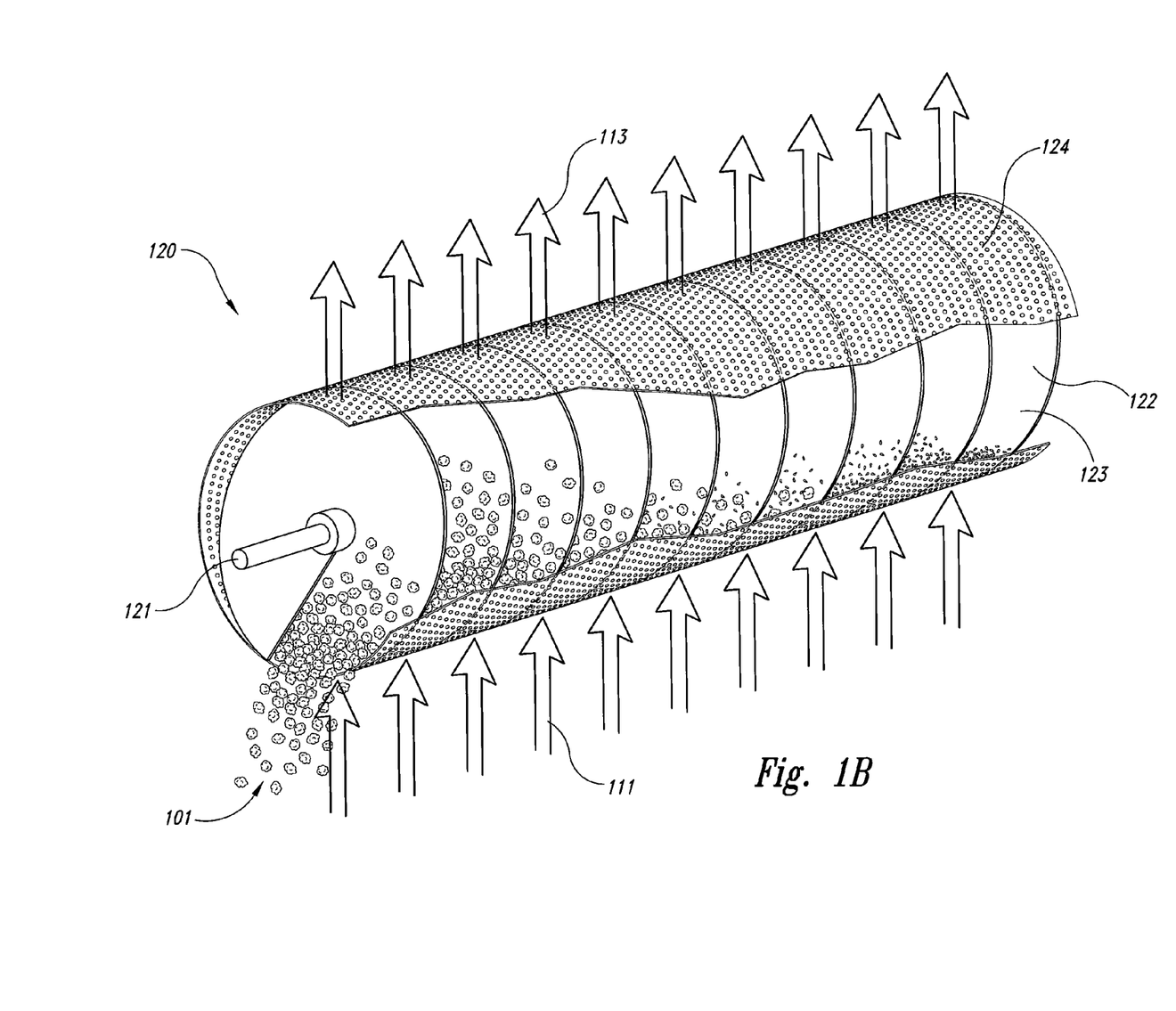
FIG. 1B is an isometric view of a popping drum of the popping machine of FIG. 1A.

FIG. 1A is a schematic side view of a popcorn popping machine 100 ("popping machine") configured in accordance with an embodiment of the disclosure. In the illustrated embodiment, the popping machine 100 includes a cabinet or housing 102 enclosing a popping drum 120, an air mover 132 (e.g., an axial fan, plug fan, centrifugal fan, high velocity fan, etc.), and a heat source 110 (e.g., an electrical heating element, gas burner, etc.), among other components. FIG. 1B is an isometric view of the popping drum 120. Referring to FIGS. 1A and 1B together, the popping drum 120 extends longitudinally in the housing 102 and includes a corn mover 123 (e.g., a conveyor belt, screw conveyor, auger, etc.) mounted on a shaft 121. In the illustrated embodiment, the corn mover 123 is an auger 122. In one embodiment, the auger 122 can have a diameter of about 12 inches and a pitch of about 6 inches, and the shaft 121 can have a diameter of about 3 inches and a length of about 48 inches. In other embodiments, however, these dimensions can differ. For example, the auger 122 and/or the shaft 121 can be different sizes, and the auger 122 can have a greater pitch, a finer pitch, segments with different pitches, etc. The auger 122 is covered with a screen 124 (partially shown in FIG. 1B) wrapped around and extending along the length of the auger 122. In one embodiment, the screen 124 can be formed from perforated sheet metal that is approximately 35% open. In other embodiments, however, the screen 124 can be made from other suitable materials that are more or less than about 35% open.

In the embodiment illustrated in FIG. 1A, the popping machine 100 includes a drive assembly 130 having a relatively compact width compared with conventional dry popping machines. The drive assembly 130 includes the air mover 132 which is mounted on a support shaft 140 extending laterally across a portion of the housing 102. The support shaft 140 extends across the housing 102 from a first side 109a of the housing 102 to a second side 109b of the housing 102. More specifically, a first end portion 142 of the support shaft 140 is supported by a first bearing assembly 146 at the first side 109a, and an opposite second end portion 144 of the support shaft 140 is supported by a second bearing assembly 148 at the second side 109b. The first bearing assembly 146 and the second bearing assembly 148 are configured to support the support shaft 140 and allow the support shaft 140 to rotate about its longitudinal axis to drive the air mover 132. In the illustrated embodiment, the first bearing assembly 146 and the second bearing assembly 148 are each attached to an exterior surface of the housing 102. In other embodiments, however, the first bearing assembly 146 and the second bearing assembly 148 can be located at other positions, including, for example, inside the housing 102, integral with the housing 102, etc. In still further embodiments, the support shaft 140 can be cantilevered from a side portion of the housing 102. Moreover, as also shown in the illustrated embodiment, the longitudinal or rotational axis of the support shaft 140 extends in a direction that is generally perpendicular to a longitudinal or rotational axis of the shaft 121 of the corn mover 123.

In the illustrated embodiment, the first end portion 142 of the support shaft 140 extends outwardly beyond the first bearing assembly 146 and is operably coupled to a first pulley 152. A chain or belt 154 operably couples the first pulley 152 to a second pulley 156. The second pulley 156 is carried by a drive shaft 158 extending from and operably coupled to a motor 150 (shown schematically). As a result, the motor 150 rotates second pulley 156, which drives the first pulley 152 via the belt 154. In the illustrated embodiment, the motor 150 is attached to a lower portion of the housing 102. In other embodiments, however, the motor 150 can be positioned in other locations. For example, the motor 150 can be positioned on the side of the housing 102 above, below, or laterally spaced apart from the first bearing assembly 146. In still further embodiments, the motor 150 can be operably coupled directly to the first end portion 142 of the support shaft 140 to drive the support shaft 140 without the use of the first pulley 152, the belt 154, and/or the second pulley 156.

The interior of the housing 102 is separated into a first side 103 and a second side 105 by a first divider or partition member 104 extending longitudinally through the housing 102. The heat source 110 is mounted inside the housing 102 in the second side 105, and the air mover 132 is mounted in the first side 103. In the illustrated embodiment, an air intake portion 134 of the air mover 132 extends through a portion of the first partition member 104 to draw air from the second side 105. The popping drum 120 is positioned above the air mover 132 and over an opening or slot 107 extending longitudinally through the housing 102. The slot 107 is formed between a second partition member 106 spaced apart from a third partition member 108. The second partition member 106 extends from the first partition member 104, and the third partition member 108 extends from a side portion of the housing 102. In the illustrated embodiment, the slot 107 can have a width of about 4 inches. In other embodiments, however, the slot 107 can have a greater or lesser width than about 4 inches.

In operation, the popping drum 120 can act as a fluidized bed dryer when heated air is forced through the screen 124 to pop the popcorn 101. In the illustrated embodiment, kernels of corn can be fed into one end of the popping drum 120 as the popping drum 120 rotates in the direction of arrow 119. In this manner, the popping drum 120 moves the kernels from one end of the popping drum 120 to the opposite end of the popping drum 120 over the slot 107. As the corn kernels are moved over the slot 107, the air mover 132 forces heated air through the slot 107 to pop the popcorn kernels as shown in FIG. 1B. More specifically, the heat source 110 heats the surrounding air in the second portion 105 of the housing 102. In one embodiment, the air is heated between about 420 to about 450 degrees Fahrenheit, e.g., about 435 degrees Fahrenheit. In other embodiments, however, the air can be heated to be more or less than about 435 degrees Fahrenheit. The air mover 132 draws the heated air, indicated by arrows 115, from the second side 105 through the blower intake portion 134. The air mover 132 forces the heated air, indicated by arrows 111, from the first side 103 through the slot 107. As the heated air passes into the popping drum 120, the popcorn kernels on the bottom of the popping drum 120 are lifted and agitated by the force of the air and behave like a fluid. The high velocity of the heated air provides a very high heat transfer rate, and the kernels 101 pop. After the air passes through the popping drum 120, indicated by arrow 113, the air returns to the second side 105 and travels by the heater 110 and again into the intake portion 134 of the blower.

Figure 2A:
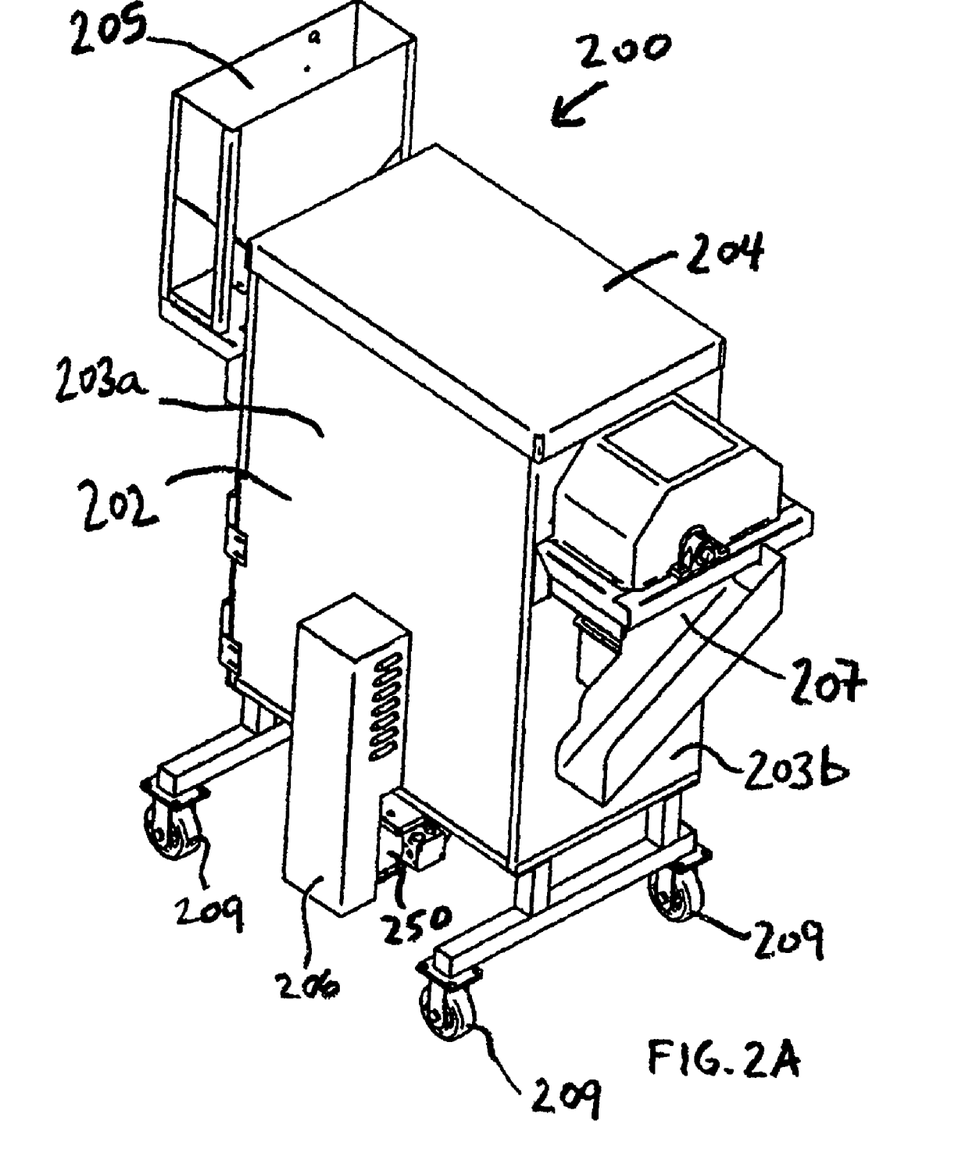

FIG. 2A is an isometric view of a popping machine 200 configured in accordance with another embodiment of the disclosure. The popping machine 200 includes several features that are generally similar in form and function to those of the popping machine described above with reference to FIGS. 1A and 1B. In the illustrated embodiment, the popping machine 200 includes a cabinet or housing 202 having side covers 203 (only a first side cover 203a and a second side cover 203b are visible in FIG. 2A) and an upper cover 204. The popping machine 200 also includes an inlet or hopper 205 to load the unpopped kernels of corn, and an outlet or discharge chute 207 to dispense the popcorn. The popping machine 200 further includes a motor cover 206, which as described in detail below, at least partially covers a motor that drives a blower.

In the illustrated embodiment, the popping machine 200 is portable or mobile. For example, the popping machine 200 includes one more lockable rollers 209 (e.g., casters, wheels, etc.) to allow the popping machine 200 to be moved or wheeled to different locations for use. As described in detail below, the configuration of the popping machine 200 allows the popping machine 200 to be moved (e.g., rolled) through, for example, a standard doorway measuring about 34-36 inches in width.

Figure 2B:
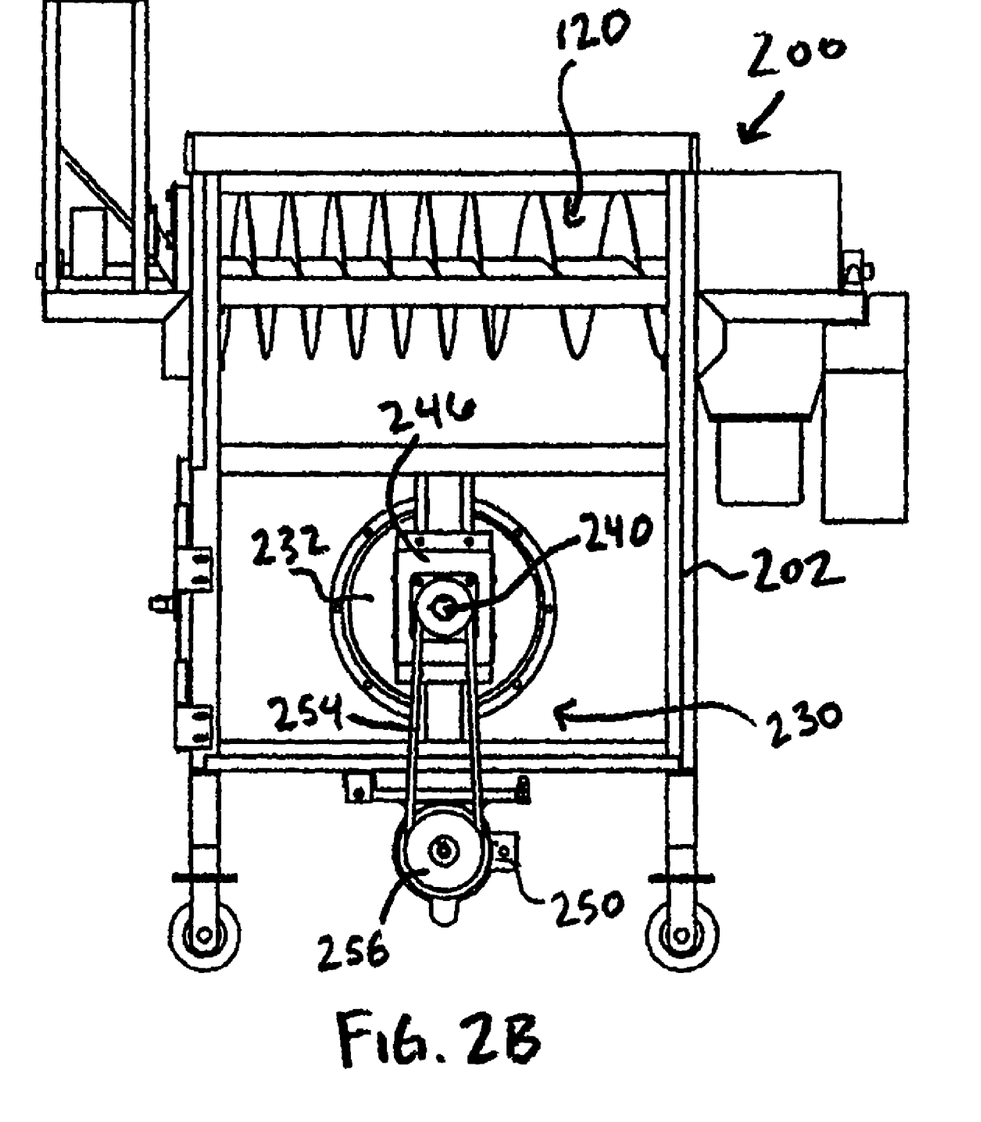
Figure 2C:
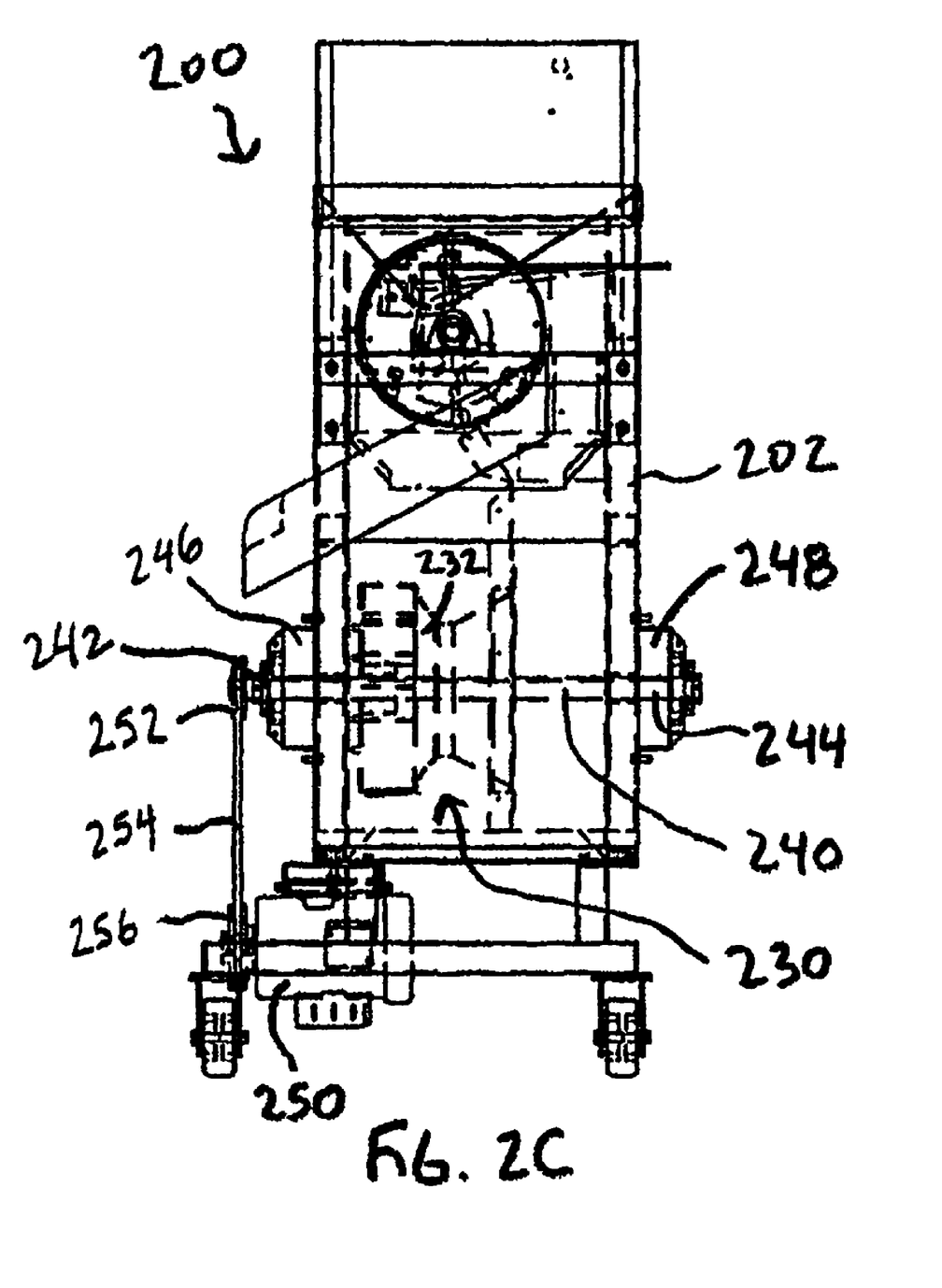

FIG. 2B is a front side view, and FIG. 2C is a right side view of the popping machine 200. Referring to FIGS. 2B and 2C together, in the illustrated embodiment, the first side cover 203a and the second side cover 203b have been removed for purposes of illustrating certain components of the popping machine 200. For example, the popping machine 200 includes the popping drum 120 described above with reference to FIGS. 1A and 1B. The popping machine 200 also includes a drive assembly 230 with an air mover 232 mounted on a rotating shaft 240 extending laterally across the popping machine 200. The air mover 232 is operably coupled to the shaft 240 such that rotation of the shaft 240 drives the air mover 232 blades to force air through the popping machine 200. A first end portion 242 of the shaft 240 is operably coupled to a first bearing assembly 246, and an opposite second end portion 244 of the shaft is operably coupled to a second bearing assembly 248. The first end portion 242 of the shaft 240 protrudes from the first bearing assembly 246 and is operably coupled to a first pulley 252. A belt 254 extends between the first pulley 252 and a second pulley 256, which is in turn operably coupled to a motor 250. In operation, the motor 250 rotates the shaft 240 through the second pulley 256, the belt 254, and the first pulley 252, thereby driving the air mover 232.

In the illustrated embodiment, the motor 250 is attached to a lower portion of the housing 202. In other embodiments, however, the motor 250 can be positioned at different locations on the popping machine 200. For example, the motor 250 can be positioned above, below, or laterally adjacent to the first bearing assembly 242. Moreover, in other embodiments, the motor 250 can be operably coupled directly to the shaft 240 to drive the air mover 232 without the first pulley 252, belt 254, and/or second pulley 256.

Figure 2D:
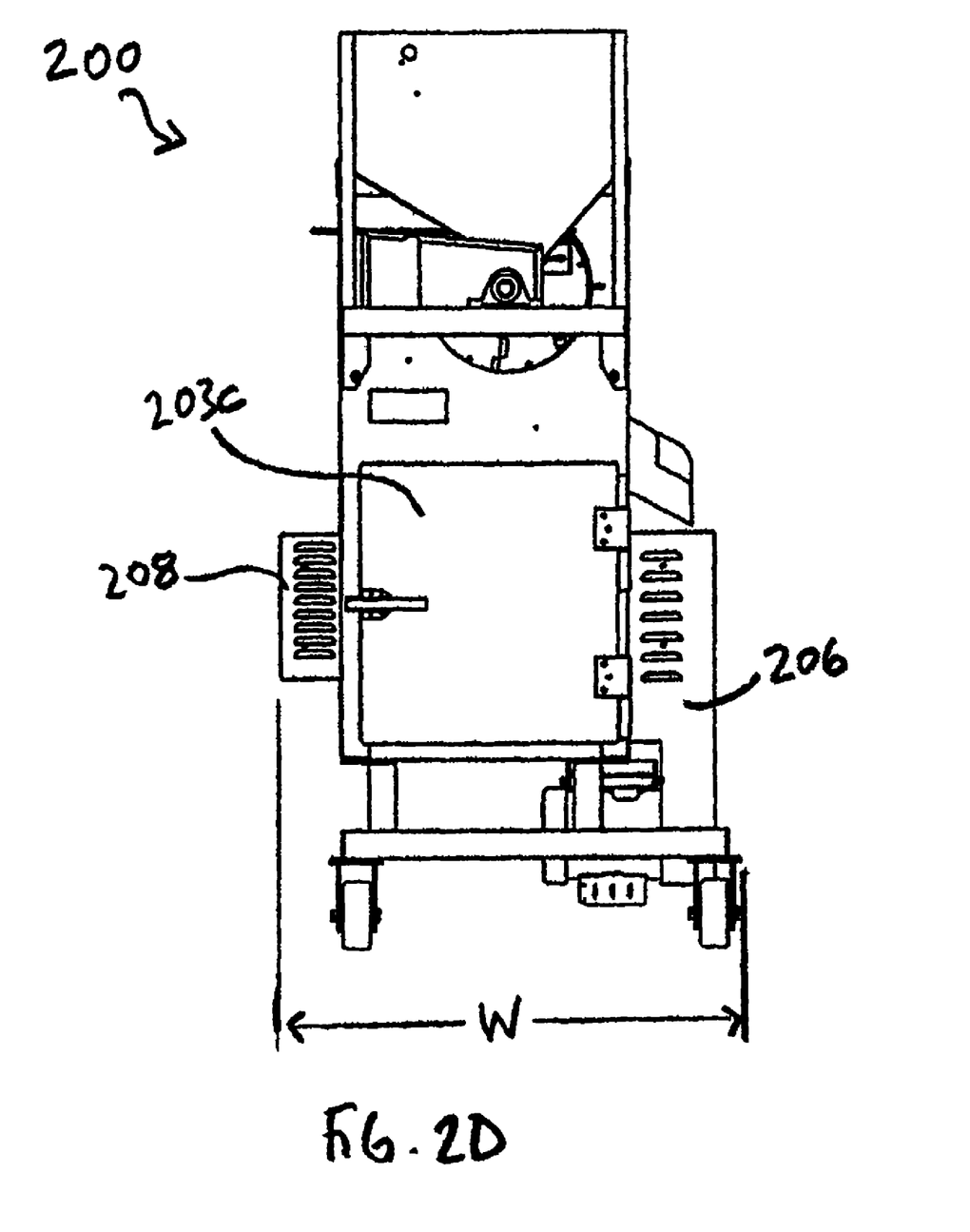
Figure 2E:
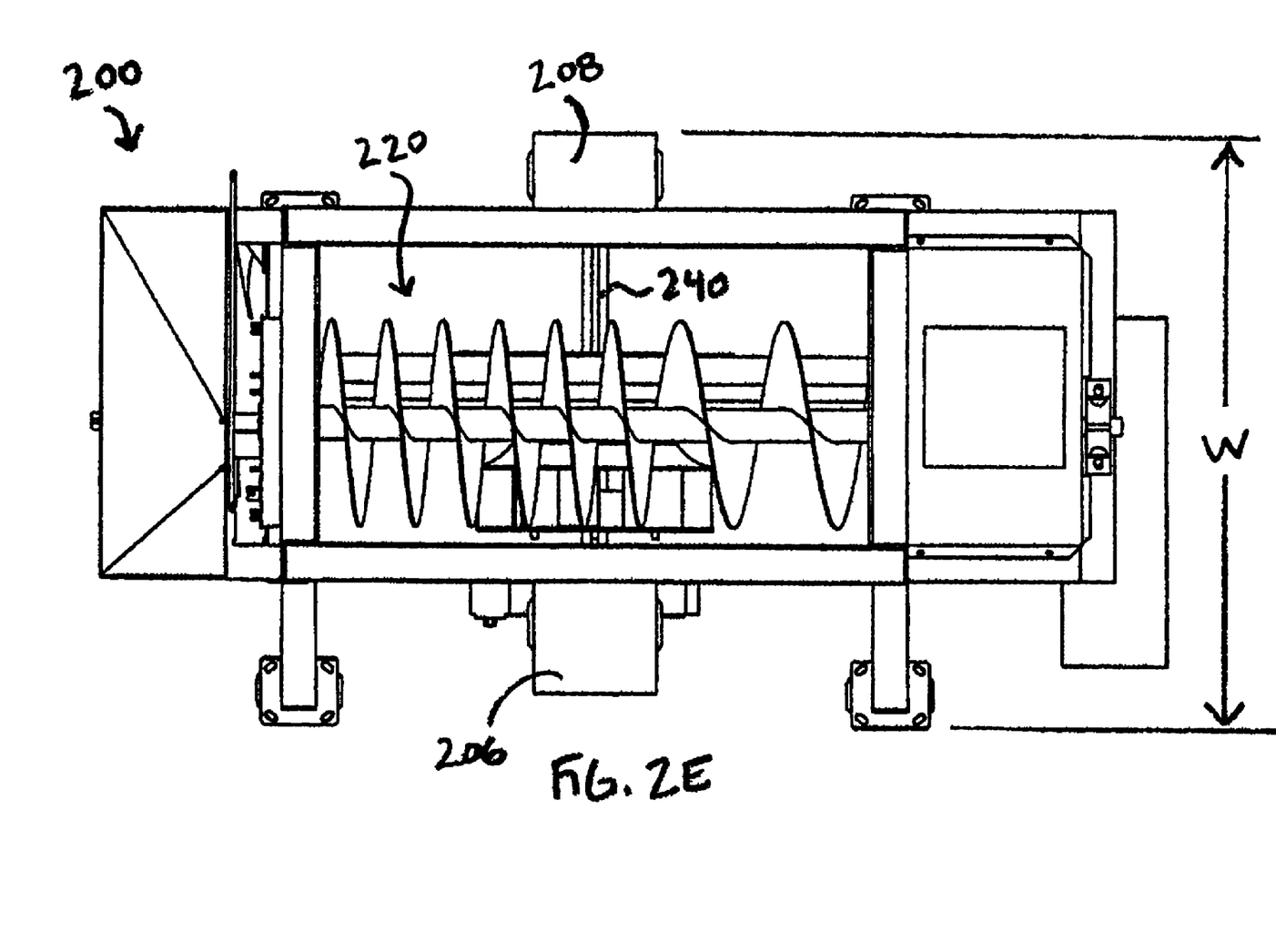
FIG. 2E is a plan view of a popcorn popping machine configured in accordance with another embodiment of the disclosure.

FIG. 2D is a left side view, and FIG. 2E is a plan view of the popping machine 200. Referring to FIGS. 2D and 2E together, in the illustrated embodiment, the popping machine 200 is shown with a third side cover 203c covering a side portion of the popping machine 200. The illustrated embodiment also includes a second bearing assembly cover 208 generally opposite the motor cover 206. The motor cover 206 at least partially encases and/or hides the first bearing assembly 242 and the motor 250 (FIG. 2C), and the second bearing assembly cover 208 at least partially encases and/or hides the second bearing assembly 244 (FIG. 2C).

In the illustrated embodiment, the popping machine 200 has an overall width W that is less than the overall width of a conventional dry popping machine. In certain embodiments, for example, the overall width W of the popping machine 220 can be less than about 36 inches, e.g., less than about 34 inches. More specifically, in one embodiment, the overall width W can be about 25 inches. In other embodiments, however, the overall width W can be greater than or less than about 25 inches. The reduced overall width W of the illustrated popping machine 200 can be achieved due to the configuration of the drive assembly 230 described above with reference to FIGS. 2B and 2C (and/or the drive assembly 130 described above with reference to FIG. 1A). More specifically, the shaft 240 supporting the air mover 232 is contained primarily within the housing 202, with only a relatively short segment of the first end portion 242 of the shaft 240 projecting from the housing 202. This differs from conventional dry popping machines that include a cantilevered shaft and associated support structure for the blower, that extend outwardly from the housing. In this manner, the illustrated embodiment of the popping machine 200 can be moved (e.g., rolled) through standard doorways typically measuring 34-36 inches wide. As a result, the embodiments of the popping machines described herein can be easily moved into theaters, stores, and/or other establishments that are typically only accessible via standard doorways having widths of about 34-36 inches, without disassembly of the popping machines. This is particularly useful for businesses, such as theaters, candy stores, etc., that sell large quantities of popcorn.

From the foregoing, it will be appreciated that specific embodiments of the invention have been described herein for purposes of illustration, but that various modifications may be made without deviating from the spirit and scope of the various embodiments of the invention. For example, the popping machines disclosed herein can include blowers mounted in different positions in the popping machine. Moreover, while various advantages and features associated with certain embodiments of the invention have been described above in the context of those embodiments, other embodiments may also exhibit such advantages and/or features, and not all embodiments need necessarily exhibit such advantages and/or features to fall within the scope of the disclosure. Accordingly, the invention is not limited, except as by the appended claims.

I claim:

1. A portable popcorn popping machine comprising:
a housing having an interior portion;
a corn mover positioned inside the housing, wherein the corn mover rotates about a longitudinal axis to move corn kernels through the interior portion;
a heat source positioned inside the housing and configured to heat air in the interior portion;
a support shaft extending through the interior portion in a direction generally perpendicular to the longitudinal axis of the corn mover, wherein the support shaft includes a first end portion opposite a second end portion, and wherein each of the first and second end portions is rotatably coupled to the housing;
an air mover carried by the support shaft, wherein the air mover directs heated air from the heat source through the corn mover to pop the corn kernels into popcorn;
a power source carried by the housing;
a first pulley operably coupled to the power source;
a second pulley positioned exterior of the housing and operably coupled to the first end portion of the support shaft; and
a drive member operably coupling the first pulley to the second pulley, wherein the power source rotates the first pulley to drive the second pulley via the drive member, and wherein the second pulley rotates the support shaft to drive the air mover and move the heated air from the heat source to the corn mover.

2. A portable popcorn popping machine comprising:
a housing having an interior portion;
a corn mover positioned inside the housing, wherein the corn mover rotates about a longitudinal axis to move corn kernels through the interior portion;
a heat source positioned inside the housing and configured to heat air in the interior portion;
a support shaft extending through the interior portion in a direction generally perpendicular to the longitudinal axis of the corn mover, wherein the support shaft includes a first end portion opposite a second end portion, and wherein each of the first and second end portions is rotatably coupled to the housing;
an air mover carried by the support shaft, wherein the air mover directs heated air from the heat source through the corn mover to pop the corn kernels into popcorn;
a first bearing assembly attached to the housing and operably coupled to the first end portion of the support shaft; and
a second bearing assembly attached to the housing and operably coupled to the second end portion of the support shaft, wherein the support shaft rotates about the first and second bearing assemblies.

3. The popcorn popping machine of claim 2, further comprising a power source positioned outside the housing and operably coupled to the support shaft, wherein the power source drives the air mover to move the heated air from the heat source to the corn mover.

4. The popcorn popping machine of claim 2 wherein the corn mover includes an auger.

5. A portable popcorn popping machine comprising:
a housing having an interior portion;
a corn mover positioned inside the housing, wherein the corn mover rotates about a longitudinal axis to move corn kernels through the interior portion;
a heat source positioned inside the housing and configured to heat air in the interior portion;
a support shaft extending through the interior portion in a direction generally perpendicular to the longitudinal axis of the corn mover, wherein the support shaft includes a first end portion opposite a second end portion, and wherein each of the first and second end portions is rotatably coupled to the housing;
an air mover carried by the support shaft, wherein the air mover directs heated air from the heat source through the corn mover to pop the corn kernels into popcorn; and
a partition separating a first side of the interior portion from a second side of the interior portion, wherein the air mover is positioned in the first side and the heat source is positioned in the second side, wherein the air mover draws heated air from the second side and directs the heated air through the first side towards the corn mover, and wherein the support shaft extends through the first and second sides of the interior portion.

6. A portable popcorn popping machine comprising:
a housing having an interior portion;
a corn mover positioned inside the housing, wherein the corn mover rotates about a longitudinal axis to move corn kernels through the interior portion;
a heat source positioned inside the housing and configured to heat air in the interior portion;
a support shaft extending through the interior portion in a direction generally perpendicular to the longitudinal axis of the corn mover, wherein the support shaft includes a first end portion opposite a second end portion, and wherein each of the first and second end portions is rotatably coupled to the housing; and an air mover carried by the support shaft, wherein the air mover directs heated air from the heat source through the corn mover to pop the corn kernels into popcorn, wherein the popcorn popping machine has an overall width that is equal to or less than about 36 inches.

7. The popcorn popping machine of claim 6 wherein the popcorn popping machine has an overall width that is equal to or less than about 25 inches.

8. A portable popcorn popping machine comprising:
a housing having an interior portion;
a corn mover including an auger, the corn mover positioned inside the housing, wherein the corn mover rotates about a longitudinal axis to move corn kernels through the interior portion;
a perforated mesh enclosing the auger;
a heat source positioned inside the housing and configured to heat air in the interior portion;
a support shaft extending through the interior portion in a direction generally perpendicular to the longitudinal axis of the corn mover, wherein the support shaft includes a first end portion opposite a second end portion, and wherein each of the first and second end portions is rotatably coupled to the housing; and
an air mover carried by the support shaft, wherein the air mover directs heated air from the heat source through the corn mover to pop the corn kernels into popcorn.

9. A popcorn popping device comprising:
a housing having an interior portion and a first side portion opposite a second side portion;
a corn mover positioned in the housing and configured to move corn kernels through the interior portion;
a heat source spaced apart from the corn mover within the housing;
an air mover positioned in the housing on a support shaft extending from the first side portion to the second side portion, wherein the air mover directs heated air from the heat source to the corn kernels carried by the corn mover;
a first bearing assembly attached to the first side portion of the housing; and
a second bearing assembly attached to the second side portion of the housing, and wherein the support shaft extends across the interior portion of the housing and includes a first end portion operably coupled to the first bearing assembly and a second end portion operably coupled to the second bearing assembly.

10. The popcorn popping device of claim 9 wherein the air mover has a first rotational axis and the corn mover has a second rotational axis that is generally transverse to the first rotational axis.

11. The popcorn popping device of claim 9, further comprising:
a pulley attached to the first end portion of the support shaft exterior to the housing, and
a power source carried by the housing and operably coupled to the pulley, wherein the power source is configured to rotate the pulley and the support shaft to drive the air mover.

12. A popcorn popping device comprising:
a housing having an interior portion and a first side portion opposite a second side portion;
a corn mover positioned in the housing and configured to move corn kernels through the interior portion;
a heat source spaced apart from the corn mover within the housing;
an air mover positioned in the housing on a support shaft extending from the first side portion to the second side portion, wherein the air mover directs heated air from the heat source to the corn kernels carried by the corn mover; and
a partition dividing the interior portion of the housing into a first interior portion and a second interior portion, wherein the support shaft extends completely through each of the first and second interior portions.

13. The popcorn popping device of claim 12 wherein the air mover is attached to the partition and directs the heated air radially outwardly towards the corn mover through an opening in the partition, and wherein the air mover draws air past the heat source from the second interior portion into an air intake portion of the air mover.

14. A popcorn popping device comprising:
a housing having an interior portion and a first side portion opposite a second side portion;
a corn mover positioned in the housing and configured to move corn kernels through the interior portion;
a heat source spaced apart from the corn mover within the housing; and
an air mover positioned in the housing on a support shaft extending from the first side portion to the second side portion, wherein the air mover directs heated air from the heat source to the corn kernels carried by the corn mover, wherein the popcorn popping device has an overall width of approximately 36 inches or less.

15. A portable popcorn popping machine comprising:
a housing enclosing an interior portion between a first side portion and a second side portion;
means for moving corn kernels through the interior portion;
means for heating air within the interior portion;
means for moving heated air through the interior portion from the means for heating to the means for moving corn kernels; and
means for supporting the means for moving heated air, wherein the means for supporting are operably coupled to the first side portion of the housing and the second side portion of the housing, wherein the means for supporting includes a support shaft having a first end portion opposite a second end portion, wherein the first end portion is operably coupled to the first side portion of the housing and the second end portion is operably coupled to the second side portion of the housing, and wherein the first end portion is coupled to a first bearing assembly carried by the housing and the second end portion is coupled to a second bearing assembly carried by the housing, and wherein the support shaft extends across the interior portion and rotates within the first and second bearing assemblies to drive the means for moving heated air.

16. The portable popcorn popping machine of claim 15 wherein the means for moving heated air includes a fan that rotates about a rotational axis that is generally perpendicular to a longitudinal axis of the means for moving corn kernels.

* * * * *